US000001967H

(19) United States

(12) Statutory Invention Registration (10) Reg. No.: US H1967 H

Woolf (43) Published: Jun. 5, 2001

(54) METHODS FOR IMPROVING THE ADHESION AND/OR COLORFASTNESS OF INK JET INKS WITH RESPECT TO SUBSTRATES APPLIED THERETO

(75) Inventor: Jerome A. Woolf, San Diego, CA (US)

(73) Assignee: Kimberly-Clark Worldwide, Inc., Neenah, WI (US)

(21) Appl. No.: 09/109,681

(22) Filed: Jul. 2, 1998

(51) Int. Cl.[7] ..... B05D 3/02

(52) U.S. Cl. ..... 427/288; 427/388.4; 427/388.5; 427/389.7; 427/391; 427/393; 427/393.5; 427/395; 427/397; 427/388.1; 106/22 R; 106/20 D

(58) Field of Search ..... 427/388.1, 388.4, 427/388.5, 389.7, 391, 393, 393.5, 395, 397; 106/22 R, 20 D

(56) References Cited

U.S. PATENT DOCUMENTS

| | | | | |
|---|---|---|---|---|
| 4,137,243 | * | 1/1979 | Farmer | 260/378 |
| 4,483,712 | * | 11/1984 | Murphy | 106/30 |
| 4,931,094 | * | 6/1990 | Barfurth et al. | 106/20 |
| 5,021,596 | * | 6/1991 | Barfurth et al. | 556/55 |
| 5,104,913 | * | 4/1992 | Sharma et al. | 523/339 |
| 5,108,503 | * | 4/1992 | Hindagolla et al. | 106/22 |
| 5,231,135 | * | 7/1993 | Machell et al. | 525/123 |
| 5,268,030 | * | 12/1993 | Floyd et al. | 106/450 |
| 5,389,132 | * | 2/1995 | Davulcu et al. | 106/20 R |
| 5,529,616 | * | 6/1996 | Prassad | 106/20 R |
| 5,897,694 | * | 4/1999 | Woolf | 106/31.27 |

FOREIGN PATENT DOCUMENTS

95/28285 10/1995 (WO) .

* cited by examiner

*Primary Examiner*—Charles T. Jordan
*Assistant Examiner*—Aileen J. Baker

(57) ABSTRACT

A method of improving the adhesion of an ink jet ink formulation to a substrate, which method includes adding to the ink jet ink formulation an amount of a chelate of a transition metal or a chelate of a mixture of transition metals effective to improve the adhesion of the ink jet ink formulation to the substrate; printing the substrate with the chelate-containing ink jet ink formulation; and treating the printed substrate with heat for a time and at a temperature to further improve the adhesion of the ink jet ink formulation to the substrate. The ink jet ink formulation typically will include a diluent system and colorant. The chelate typically will be present in the ink jet ink formulation in a range of about 0.001 up to about 20 percent by weight, based on the total weight of the chelate-containing ink jet ink formulation. A particularly desirable chelate is zirconium lactate. The present invention also provides an article and a substrate produced by the foregoing method.

27 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHODS FOR IMPROVING THE ADHESION AND/OR COLORFASTNESS OF INK JET INKS WITH RESPECT TO SUBSTRATES APPLIED THERETO

FIELD OF THE INVENTION

The present invention relates to ink formulations suitable for use in ink jet applications, as well as methods for the use thereof, and articles produced therefrom. In a particular aspect, the present invention relates to ink jet formulations which have excellent adhesion and colorfast properties. That is, the inks of the present invention are sufficiently resistant to removal that the ink can not readily be altered or removed from the substrate once applied thereto.

BACKGROUND OF THE INVENTION

Ink jet printing is a non-impact and non-contact printing method in which an electronic signal controls and directs droplets or a stream of ink that can be deposited on a wide variety of substrates. Ink jet printing is extremely versatile in terms of the variety of substrates that can be treated, as well as the print quality and the speed of operation that can be achieved. In addition, ink jet printing is digitally controllable. For these reasons, ink jet methodology has been widely adopted for industrial marking and labeling. In addition, ink jet methodology has also found widespread use in architectural and engineering design applications, medical imaging, office printing (of both text and graphics), geographical imaging systems (e.g., for seismic data analysis and mapping), signage, in display graphics (e.g., photographic reproduction, business and courtroom graphics, graphic arts), and the like.

Both dyes and pigments have been used as colorants for ink jet formulations. However, such materials do not always adhere well to the substrate to which the ink is applied. For example, dyes may dissolve upon contact with water. Thus, images applied employing ink jet methodology may tend to run or smear upon repeated contact, or may actually be removed from the printed surface if exposed to substantial quantities of aqueous media (e.g., if an ink jet printed article is laundered). Moreover, images applied employing ink jet methodology may also tend to fade or washout upon prolonged exposure to visible, ultraviolet and/or infrared light.

Accordingly, there is still a need in the art for ink jet formulations which have improved adhesion properties and/or colorfastness when printed on a variety of substrates.

SUMMARY OF THE INVENTION

In accordance with the present invention, it has been discovered that the adhesion properties and/or colorfastness of ink jet formulations when applied to a variety of substrates can be improved by adding a specific class of additives thereto and subsequently heat treating the printed substrates. Thus, the present invention enables the formation of water-resistant (e.g., washable), colorfast images on a wide variety of substrates utilizing ink jet printing technology.

Accordingly, the present invention addresses some of the difficulties and problems discussed above by providing a method of improving the adhesion of an ink jet ink formulation to a substrate. The method includes:

adding to the ink jet ink formulation an amount of a chelate of a transition metal or a chelate of a mixture of transition metals effective to improve the adhesion of the ink jet ink formulation to the substrate;

printing the substrate with the chelate-containing ink jet ink formulation; and treating the printed substrate with heat for a time and at a temperature to further improve the adhesion of the ink jet ink formulation to the substrate.

In general, the ink jet ink formulation includes a diluent system and colorant. For example, the diluent system may be an aqueous diluent system or a non-aqueous diluent system.

In general, the substrate may be any substrate upon which images may be placed by ink jet printing techniques. For example, the substrate may be paper, fabric, a polymeric film, a cellulosic film, glass, metal, wood, vellum, or carbon. As another example, a fabric substrate may contain free hydroxyl and/or free carboxyl groups. As a further example, a fabric substrate may be 100 percent cotton, a cotton/polyester blend, silk, rayon, wool, nylon, latex, butyl rubber, vinyl, or a polyamide fiber. As yet another example, a paper substrate may be ragbond paper, coated paper, or emulsion coated paper.

Also by way of example, the chelate may be a derivative of caprylic acid, capric acid, citric acid, lactic acid, lauric acid, myristic acid, palmitic acid, stearic acid, tartaric acid, cyclohexanecarboxylic acid, boric acid, or an ammonium complex. The transition metal or mixture of transition metals generally may be selected from the group consisting of Ti, V, Cr, Mn, Fe, Co, Ni, Cu, Zr, Nb, Mo, Ru, Rh, Pd, W, Ti-Ni, Ni-Cr, Fe-Co, Ti-W, Fe-Ti, Fe-Ni, Fe-Cr, Fe-Ni-Cr, Mo-Si and W-Si.

The chelate typically will be present in the ink jet ink formulation in a range of about 0.001 up to about 20 percent by weight, based on the total weight of the chelate-containing ink jet ink formulation. A particularly desirable chelate is zirconium lactate.

The colorant generally may be a dispersion of a pigment, a dye, or a polymeric colorant. The ink jet ink formulation typically may contain a dispersion of a pigment in a range of about 6 up to about 20 percent by weight. The ink jet ink formulation typically may contain a dye in a range of about 4 up to about 20 percent by weight. The ink jet ink formulation typically may contain a polymeric colorant in a range of about 1 up to about 12 percent by weight.

More generally, the ink jet ink formulation may further include one or more of a biocide, a surface active agent, a corrosion inhibitor, a pH adjusting agent, an aqueous diluent, a non-aqueous diluent, an ultraviolet absorber, and an infrared absorber, as well as other additives known to those having ordinary skill in the art.

The present invention also provides an article produced by the method described hereinabove. The present invention further provides a fabric substrate having an ink jet image printed thereon by the method described hereinabove, wherein the image adheres sufficiently to the fabric substrate to resist removal therefrom upon washing of the fabric substrate. The present invention additionally provides a substrate having an ink jet image printed thereon by the method described hereinabove, wherein the image adheres sufficiently to the substrate to resist removal therefrom upon repeated contact of the substrate with water.

The present invention additionally provides, in a method of improving the adhesion of an ink jet ink formulation to a substrate, wherein the method includes adding to the ink jet ink formulation an amount of a chelate of a transition metal or a chelate of a mixture of transition metals effective to improve the adhesion of the ink jet ink formulation to the substrate; the improvement which includes:

printing the substrate with the chelate-containing ink jet ink formulation; and treating the printed substrate with heat for a time and at a temperature to further improve the adhesion of the ink jet ink formulation to the substrate.

DETAILED DESCRIPTION OF THE INVENTION

In accordance with the present invention, there are provided methods to improve the adhesion properties and/or colorfastness of ink jet formulations when applied to a substrate, said method comprising adding to said ink jet formulation an amount of an additive effective to improve the adhesion and/or colorfastness of said ink jet formulation with respect to said substrate.

Ink jet formulations contemplated for use in the practice of the present invention typically comprise a diluent system and colorant. Both aqueous diluent systems and non-aqueous diluent systems may be employed in accordance with the invention.

Exemplary aqueous diluent systems contemplated for use in the practice of the present invention include:

- water containing in the range of about 0.5 up to about 3.0 percent by weight of a mixture of isopropyl alcohol and at least one alcohol having a boiling point of less than 130° C.,
- water containing in the range of about 2.5 up to about 25 percent by weight of pyrrolidone or a derivative thereof,
- water containing in the range of about 2 up to about 20 percent by weight of 1,3-propanediol or a derivative thereof,
- water containing in the range of about 1 up to about 50 percent by weight of a glycol ether,
- water containing in the range of about 5 up to about 25 percent by weight isopropyl alcohol, about 30 up to about 80 percent by weight of N-methyl pyrrolidone, and 0 up to about 60 percent by weight of ethylene glycol monoethyl ether, and the like.

Presently desired aqueous diluent systems contemplated for use in the practice of the present invention include:

- compositions including 87.1 percent by weight distilled water and 5 percent by weight 2-pyrrolidone;
- compositions including 89 percent by weight distilled water and 4 percent by weight 2-pyrrolidone;
- compositions including 74.1 percent by weight distilled water, 5 percent by weight glycerin, 5 percent by weight thiodiglycol, and 2 percent by weight diethylene glycol;
- compositions including 90.6 percent by weight distilled water and 4.1 percent by weight 2-pyrrolidone;
- compositions including 86.8 percent by weight distilled water and 4 percent by weight polyethylene glycol 400;
- compositions including 15.4 percent by weight water, 7.6 percent by weight isopropyl alcohol, 61.0 percent by weight N-methyl pyrrolidone, and 13.7 percent by weight ethylene glycol monoethyl ether;

and the like.

Exemplary non-aqueous diluent systems contemplated for use in the practice of the present invention include methyl lactate, ethyl lactate, butyl lactate, isopropyl lactate, diacetone alcohol, ethylene glycol, diethylene glycol, triethylene glycol, 1,3-butylene glycol, 1,5-pentanediol, isophorone, xylene, mineral spirits, aromatic 100, glycerol, ethylene glycol monomethyl ether, propylene glycol monomethyl ether, diethylene glycol mono n-hexyl ether, and the like, as well as mixtures of any two or more thereof.

The chelates contemplated for use in the practice of the present invention are typically chelates of transition metals (or chelates of mixtures of transition metals). Chelates contemplated for use herein include chelates of alpha-hydroxy carboxylic acid ligands, e.g., derivatives of caprylic acid, capric acid, citric acid (e.g., zirconium sodium citrate), lactic acid (e.g., zirconium lactate, zirconium ammonium lactate, zirconium triethanolamine lactate, zirconium diisopropylamine lactate, zirconium sodium trilactate, and the like), lauric acid, myristic acid, palmitic acid, stearic acid, tartaric acid (e.g., zirconium sodium tartrate), cyclohexanecarboxylic acid, and the like, as well as derivatives of boric acid, ammonium complexes (e.g., zirconium monoalkylammonium complex, zirconium dialkylammonium complex, zirconium trialkylammonium complex, zirconium triethanolamine complex, and the like), and the like, as well as mixtures of any two or more thereof. Chelates employed in the practice of the present invention can optionally include non-metal containing adhesion promoters as are well known in the art, such as, for example, silanes (e.g., alkoxysilane polyalkylene-imines), and the like.

Exemplary transition metals (or mixtures thereof) contemplated for use herein include Ti, V, Cr, Mn, Fe, Co, Ni, Cu, Zr, Nb, Mo, Ru, Rh, Pd, W, Ti-Ni, Ni-Cr, Fe-Co, Ti-W, Fe-Ti, Fe-Ni, Fe-Cr, Fe-Ni-Cr, Mo-Si, W-Si, and the like.

A presently more desired chelate contemplated for use in accordance with the present invention is zirconium lactate.

The chelates employed in accordance with the present invention can be added over a wide range. Typically, in the range of about 0.001 up to about 20 percent by weight of chelate, based on the total weight of the chelate-containing ink jet ink formulation, may be employed. It is presently desired that in the range of about 0.005 percent by weight up to about 5 percent by weight of the chelate be employed, with in the range of about 0.01 percent by weight up to about 0.2 percent by weight of said additive being the presently most desired range.

A wide variety of substrates are contemplated for use in the practice of the present invention, e.g., papers, fabrics, polymeric films, cellulosic films, glasses, metals, sintered metals, woods, carbon-based materials, ceramics, and the like.

Exemplary papers contemplated for use in the practice of the present invention include ragbond papers, coated papers (e.g., matte papers, semigloss papers, clear film papers, high gloss photographic papers, semi-gloss photographic papers, latex papers, color inkjet papers, presentation papers, and the like), heavy coated papers, opaque bond papers, translucent bond papers, vellum, papers treated for ink, dye or colorant receptivity, and the like.

Fabrics contemplated for use in the practice of the present invention include any fabric prepared from fibers which (naturally or by post-treatment) contain free hydroxyl and/or free carboxyl groups. Exemplary fibers from which suitable fabrics can be prepared include 100% cotton, cotton/polyester blends, polyesters, silks, rayons, wools, polyamides, nylons, aramids, acrylics, modacrylics, polyolefins, spandex, saran, linens, hemps, jutes, sisals, latexes, butyl rubbers, vinyls, polyamide fibers, aluminum, stainless steel, novoloids, fabrics treated for ink, dye or colorant receptivity, and the like, as well as combinations of any two or more thereof.

Exemplary polymeric films include poly(acrylonitrile), poly(butadiene styrene), polycarbonate, polyester treated for ink, dye or colorant receptivity, and the like.

Exemplary cellulosic films include cellulose acetate, cellophane, cellulose acetate butyrate, cellulose triacetate, ethyl cellulose, cellulose nitrate, rayons, and the like.

Exemplary metal substrates include steel, stainless steel, ferritic stainless steel, aluminum, chromium oxide, iron oxide, iron cobalt, nickel, chromium, molybdenum, tungsten, magnetite, nickel oxide, cobalt oxide, vanadium oxide, titanium oxide, zirconium oxide, silicon oxide, tin oxide, and the like.

An exemplary sintered metal substrate contemplated for use in the practice of the present invention is tungsten carbide.

A wide variety of ceramic substrates are contemplated for use in the practice of the present invention, including structural ceramic materials, piezoelectric materials, glass ceramics, magnetic ceramics, cermets, nonlinear dielectric ceramics, refractory ceramics, dry-film lubricants, composite materials, and the like. Examples of such materials include oxides (e.g., aluminum oxide, chromium oxide, iron oxide, nickel oxide, cobalt oxide, vanadium oxide, titanium oxide, zirconium oxide, silicon oxide, tin oxide, and the like), carbides (e.g., silicon carbide, hafnium carbide, and the like), borides, nitrides, silicides (e.g., molybdenum disilicide), titanates (e.g., barium titanate, lead-zirconium titanate, and the like), ferrites (e.g., barium ferrite, lead ferrite, strontium ferrite, nickel-zinc ferrite, manganese ferrite, and the like), niobates (e.g., lead niobate), sulfides (e.g., molybdenum disulfide), and the like, as well as mixtures of any two or more thereof.

As recognized by those having ordinary skill in the art, a variety of colorants can be employed for the preparation of the ink jet ink formulations suitable for use in the invention. Examples include dispersions of pigments, dyes, or polymeric colorants.

Examples of dispersions of pigments include dispersions of one or more of phthalocyanine blue, carbon black, mars black, quinacridone magenta, ivory black, prussian blue, cobalt blue, ultramarine blue, manganese blue, cerulean blue, indathrone blue, chromium oxide, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophytal yellow 8GN, toluidine red, quinacridone red, permanent crimson, rose madder, alizarin crimson, vermillion, cadmium red, permanent red FRG, brominated anthranthrone, naphthol carbamide, perylene red, quinacridone red, chromophthal red BRN, chromophthal scarlet R, aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorus oxide, potassium oxide, rutile, silicon oxide, silver oxide, sodium oxide, strontium oxide, tin oxide, titanium oxide, vanadium oxide, zinc oxide, zirconium oxide, and the like.

When the colorant component of ink jet ink formulations suitable for use in the present invention comprises a dispersion of a pigment, typically in the range of about 6 up to about 20 percent by weight of the dispersion is employed.

Examplary dyes employed for the preparation of ink jet formulations according to the present invention include C.I. Food Blacks (e.g., C.I. Food Black 1, C.I. Food Black 2, and the like), C.I. Acid Blacks (e.g., C.I. Acid Black 2, C.I. Acid Black 7, C.I. Acid Black 24, C.I. Acid Black 26, C.I. Acid Black 48, C.I. Acid Black 52, C.I. Acid Black 58, C.I. Acid Black 60, C.I. Acid Black 107, C.I. Acid Black 109, C.I. Acid Black 118, C.I. Acid Black 119, C.I. Acid Black 131, C.I. Acid Black 140, C.I. Acid Black 155, C.I. Acid Black 156, C.I. Acid Black 187, and the like), C.I. Direct Blacks (e.g., C.I. Direct Black 17, C.I. Direct Black 19, C.I. Direct Black 32, C.I. Direct Black 38, C.I. Direct Black 51, C.I. Direct Black 71, C.I. Direct Black 74, C.I. Direct Black 75, C.I. Direct Black 112, C.I. Direct Black 117, C.I. Direct Black 154, C.I. Direct Black 163, C.I. Direct Black 168, and the like), C.I. Reactive Blacks (e.g., C.I. Reactive Black 005, and the like), C.I. Acid Reds (e.g., C.I. Acid Red 1, C.I. Acid Red 8, C.I. Acid Red 17, C.I. Acid Red 32, C.I. Acid Red 35, C.I. Acid Red 37, C.I. Acid Red 42, C.I. Acid Red 57, C.I. Acid Red 92, C.I. Acid Red 115, C.I. Acid Red 119, C.I. Acid Red 131, C.I. Acid Red 133, C.I. Acid Red 134, C.I. Acid Red 154, C.I. Acid Red 186, C.I. Acid Red 249, C.I. Acid Red 254, C.I. Acid Red 256, and the like), C.I. Direct Reds (e.g., C.I. Direct Red 37, C.I. Direct Red 63, C.I. Direct Red 75, C.I. Direct Red 79, C.I. Direct Red 80, C.I. Direct Red 83, C.I. Direct Red 99, C.I. Direct Red 220, C.I. Direct Red 224, C.I. Direct Red 227, and the like), C.I. Acid Violets (e.g., C.I. Acid Violet 11, C.I. Acid Violet 34, C.I. Acid Violet 75, and the like), C.I. Direct Violets (e.g., C.I. Direct Violet 47, C.I. Direct Violet 48, C.I. Direct Violet 51, C.I. Direct Violet 90, C.I. Direct Violet 94, C.I. Direct Violet 99, and the like), C.I. Reactive Reds (e.g., C.I. Reactive Red 4, C.I. Reactive Red 23, C.I. Reactive Red 24, C.I. Reactive Red 31, C.I. Reactive Red 56, C.I. Reactive Red 120, C.I. Reactive Red 159, C.I. Reactive Red 180, C.I. Reactive Red 187, Reactive Red 195, and the like), C.I. Acid Blues (e.g., C.I. Acid Blue 9, C.I. Acid Blue 29, C.I. Acid Blue 62, C.I. Acid Blue 102, C.I. Acid Blue 104, C.I. Acid Blue 113, C.I. Acid Blue 117, C.I. Acid Blue 120, C.I. Acid Blue 175, C.I. Acid Blue 183, and the like), C.I. Direct Blues (e.g., C.I. Direct Blue 1, C.I. Direct Blue 6, C.I. Direct Blue 8, C.I. Direct Blue 15, C.I. Direct Blue 25, C.I. Direct Blue 71, C.I. Direct Blue 76, C.I. Direct Blue 78, C.I. Direct Blue 80, C.I. Direct Blue 86, C.I. Direct Blue 90, C.I. Direct Blue 106, C.I. Direct Blue 108, C.I. Direct Blue 123, C.I. Direct Blue 163, C.I. Direct Blue 165, C.I. Direct Blue 199, C.I. Direct Blue 226, and the like), C.I. Reactive Blues (e.g., C.I. Reactive Blue 7, C.I. Reactive Blue 13, Reactive Blue 21, and the like), C.I. Acid Yellows (e.g., C.I. Acid Yellow 3, C.I. Acid Yellow 17, C.I. Acid Yellow 19, C.I. Acid Yellow 23, C.I. Acid Yellow 25, C.I. Acid Yellow 29, C.I. Acid Yellow 38, C.I. Acid Yellow 49, C.I. Acid Yellow 59, C.I. Acid Yellow 61, C.I. Acid Yellow 72, and the like), C.I. Direct Yellows (e.g., C.I. Direct Yellow 11, C.I. Direct Yellow 27, C.I. Direct Yellow 28, C.I. Direct Yellow 33, C.I. Direct Yellow 39, C.I. Direct Yellow 58, C.I. Direct Yellow 86, C.I. Direct Yellow 100, C.I. Direct Yellow 142, and the like), C.I. Reactive Yellows (e.g., C.I. Reactive Yellow 2), and combinations thereof.

When the ink jet ink formulation contains a dye as the colorant, typically in the range of about 4 up to about 20 percent by weight of the dye is employed.

A wide variety of polymeric colorants are contemplated for use in the practice of the present invention. Exemplary polymeric colorants include materials having the general formula:

R-(polymeric backbone-X)$_n$ wherein:

R is an organic dyestuff radical, the polymeric backbone is a thermoplastic linear polyester, X is a reactive moiety, and n is an integer falling in the range of 1 up to about 6.

Organic dyestuff radicals contemplated for use herein include any of the structural families of dyes commonly used in the art, e.g., nitroso, nitro, azo (including monoazo, diazo and triazo), diarylmethane, acridine, methine, thiazole, phthalocyanine, anthraquinone, azine, oxazine, xanthene, indamine, and the like.

Polymeric backbones contemplated for use herein include any suitable polymeric species which renders the resulting colorant liquid. Typical of such polymeric species which may be attached to the dyestuff radical are the polymeric epoxides (e.g., polyalkylene oxides, and copolymers thereof. Typical polyalkylene oxides and copolymers thereof which can be employed to provide colorants contemplated for use herein include polyethylene oxides, polypropylene oxides, polybutylene oxides, copolymers of ethylene oxide, propylene oxide and butylene oxide, as well as other copolymers, (e.g., block copolymers in which a majority of the polymeric backbone is polyethylene oxide, polypropylene oxide and/or butylene oxide).

In accordance with the present invention, reactive moiety X can be any pendant or terminal reactive group which is capable of linking the reactive colorant to a linking agent. Presently preferred reactive moieties include -OH, $-NH_2$ and -SH.

Additional polymeric colorants contemplated for use herein include an intimate mixture of (a) a water-insoluble polymeric colorant including a linear, thermoplastic, linear (crystalline, semi-crystalline or amorphous) polyester having copolymerized therein at least 5 weight percent, based on the weight of component I of residues of one or more monomeric, organic colorant compounds, and (b) an ionic (preferably anionic) or amphoteric surfactant, optionally containing a non-ionic poly(oxyalkylene) surfactant.

Typically, polymeric colorants employed in accordance with this aspect of the invention comprise (i) a diacid component including the residues of one or more aliphatic, alicyclic or aromatic dicarboxylic acids, (ii) a diol component including the residues of one or more aliphatic or alicyclic diols, and (iii) a colorant component including the residues of one or more colorant compounds.

The ionic or amphoteric surfactants suitable for use in the above-described compositions may be selected from a wide variety of compounds, such as, for example, alkali salts of higher fatty acids (e.g., sodium stearate), glyceroyl esters, citric acid esters of monoglycerides, diacetylated tartaric acid esters of monoglycerides, sulfonated esters, and the like.

Exemplary polymeric colorants are described in U.S. Pat. No. 4,137,243, U.S. Pat. No. 5,104,913, and U.S. Pat. No. 5,231,135, each of which is hereby incorporated by reference herein in its entirety.

When the colorant component of compositions according to the invention contain a polymeric colorant as the colorant, typically in the range of about 1 up to about 12 percent by weight of said polymeric colorant is employed.

As readily recognized by those of skill in the art, ink jet ink formulations contemplated for use herein may optionally further comprise one or more of a biocide (e.g., a bactericide, a fungicide, an algicide, and the like), a surface active agent, a corrosion inhibitor, a pH adjusting agent, an aqueous diluent, a non-aqueous diluent, an ultraviolet absorber, an infrared absorber, and the like.

Presently desired chelate-containing ink jet ink formulations which fall within the scope of the present invention include:

a composition including 87.1 percent by weight distilled water, 5 percent by weight 2-pyrrolidone, 0.1 percent by weight Giv-Gard DXN (i.e., 2,6-dimethyl-m-dioxan-4-ol acetate; also known as 6-acetoxy-2,4-dimethyl-m-dioxane, available from Givaudan-Roure Corporation, Teaneck, N.J.), 0.1 percent by weight Cobratec 99 (i.e., benzotriazole, available from Cincinnati Specialties, Cincinnati, Ohio), 1 percent by weight Amp-95 (i.e., 2-amino-2-methyl-1-propanol 95%, available from Angus Chemical Company, Buffalo Grove, Ill.), 6.5 percent by weight Milliken polymeric blue colorant 10061-52 (available from Milliken Research Corporation, Spartanburg, S.C.), and 0.2 percent by weight zirconium lactate (available from Benchmark Research and Technology, Midland, Tex.);

a composition including 89 percent by weight distilled water, 4 percent by weight 2-pyrrolidone, 0.1 percent by weight Giv-Gard DXN, 0.1 percent by weight Cobratec 99, 0.3 percent by weight Amp-95, 0.3 percent by weight Surfynol 465 (i.e., ethoxylated tetramethyldecynediol, available from Air Products and Chemicals, Inc., Allentown, Pa.), 6 percent by weight Spectra Fix Black MW-B (available from Spectra Colors, Kearny, N.J.), and 0.2 percent by weight zirconium lactate;

a composition including 74.1 percent by weight distilled water, 5 percent by weight glycerin, 5 percent by weight thiodiglycol, 2 percent by weight diethylene glycol, 0.1 percent by weight Giv-Gard DXN, 1 percent by weight Tergitol (i.e., alkyloxypolyethyleneoxy ethanol, available from Union Carbide Chemicals and Plastics, Industrial Chemicals Division, Danbury, Conn.), 0.1 percent by weight Cobratec 99, 0.5 percent by weight Amp-95, 11.9 percent by weight Basacid Yellow (available from BASF Corporation Colorants, Clifton, N.J.), 0.1 percent by weight Basacid Red (available from BASF Corporation Colorants, Clifton, N.J.), and 0.2 percent by weight zirconium lactate;

a composition including 90.6 percent by weight distilled water, 4.1 percent by weight 2-pyrrolidone, 0.2 percent by weight Giv-Gard DXN, 0.2 percent by weight Cobratec 99, 0.3 percent by weight Amp-95, 0.3 percent by weight Surfynol 465, 4.1 percent by weight Spectra Fix Red 195 (available from Spectra Colors, Kearny, N.J.), and 0.2 percent by weight zirconium lactate;

a composition including 86.8 percent by weight distilled water, 4 percent by weight polyethylene glycol 400, 0.1 percent by weight Giv-Gard DXN, 0.1 percent by weight Cobratec 99, 12 percent by weight Amp-95, 7.8 percent by weight Milliken polymeric blue colorant 10061-52 (available from Milliken Research Corporation, Spartanburg, S.C.), and 0.2 percent by weight zirconium lactate;

a composition including 15.4 percent by weight distilled water, 7.6 percent by weight isopropyl alcohol, 61.0 percent by weight N-methyl pyrrolidone, 13.7 percent by weight ethylene glycol monoethyl ether, 0.1 percent by weight Giv-Gard DXN, 0.7 percent by weight Surfynol 465, 1.5 percent by weight Spectrasol Brilliant Blue GN (available from Spectra Colors, Kearny, N.J.), and 0.2 percent by weight zirconium lactate;

and the like.

Finally, the printed substrate is treated with heat for a time and at a temperature to further improve the adhesion of the ink jet ink formulation to the substrate. By way of example only, treatment times may vary from 1 minute to 90 minutes. Also by way of example, treatment temperatures may vary from about 90° C. to about 205° C. For example, treatments at about 190° C. for three minutes have given excellent results. Of course, other treatment times and temperatures may be employed, if desired.

In accordance with yet another embodiment of the present invention, there are provided articles produced by the above-described methods, employing ink jet formulations as described herein. Thus, according to the present invention, the ink jet image applied to a substrate as described herein resists removal from said substrate, even upon repeated contact of the printed substrate with water. Such repetitive contact can be the result of normal handling of an article, accidental exposure to liquid (e.g., a coffee spill), routine laundering of an article of clothing, and the like.

When articles according to the invention comprise a fabric substrate having an ink jet image printed thereon, the resulting image adheres sufficiently to said substrate to resist removal therefrom upon washing of said article. Thus, in contrast to the results with prior art ink jet ink formulations, which tend to readily wash off, the invention formulations enable one to achieve the benefits of ink jet printing technology, without compromising the ability of the deposited image to remain in place as applied.

Articles according to the present invention, i.e., substrate having an ink jet image printed thereon, also resist fading as a result of exposure to ultraviolet irradiation. Thus, in contrast to prior art formulations, which tend to fade as a result of exposure to ultraviolet radiation, invention articles display improved light fastness.

The present invention additionally provides, in a method of improving the adhesion of an ink jet ink formulation to a substrate, wherein the method includes adding to the ink jet ink formulation an amount of a chelate of a transition metal or a chelate of a mixture of transition metals effective to improve the adhesion of the ink jet ink formulation to the substrate; the improvement which includes:

printing the substrate with the chelate-containing ink jet ink formulation; and treating the printed substrate with heat for a time and at a temperature to further improve the adhesion of the ink jet ink formulation to the substrate.

The ink jet ink formulations, chelates, substrates, and treatment times and temperatures all are as described hereinbefore.

The present invention is further described by the examples which follow. Such examples, however, are not to be construed as limiting in any way either the spirit or the scope of the present invention.

EXAMPLE 1

Four ink jet ink formulations utilizing polymeric colorants were prepared to give an ink set which was applied to suitable fabric employing ink jet methodology, then washed several times to determine the ability of the ink to adhere to the fabric over extended exposure periods. The ink jet ink formulations making up the polymeric ink set are summarized below (all of the polymeric colorants were obtained from Milliken Research Corporation).

| Formula | Components | Weight Percent |
|---|---|---|
| 1 | Distilled water | 65.1 |
| | Diethylene glycol | 5.0 |
| | Giv-Gard DXN | 0.2 |
| | Triethanolamine | 1.0 |
| | Cobratec 99 | 0.1 |
| | Surfynol 465 | 0.1 |
| | Exp. Yellow 8625 | 27.0 |
| | Exp. Orange 8626 | 1.0 |
| | Zirconium lactate | 0.5 |

-continued

| Formula | Components | Weight Percent |
|---|---|---|
| 2 | Distilled water | 46.7 |
| | Diethylene glycol | 5.0 |
| | Giv-Gard DXN | 0.2 |
| | Triethanolamine | 1.0 |
| | Cobratec 99 | 0.1 |
| | Surfynol 465 | 0.1 |
| | Exp. Blue 8628 | 46.4 |
| | Zirconium lactate | 0.5 |
| 3 | Distilled water | 46.1 |
| | Diethylene glycol | 5.0 |
| | Giv-Gard DXN | 0.2 |
| | Triethanolamine | 1.0 |
| | Cobratec 99 | 0.1 |
| | Surfynol 465 | 0.1 |
| | Exp. Yellow 8627 | 47.0 |
| | Zirconium lactate | 0.5 |
| 4 | Distilled water | 23.5 |
| | Diethylene glycol | 5.0 |
| | Giv-Gard DXN | 0.2 |
| | Triethanolamine | 1.0 |
| | Cobratec 99 | 0.1 |
| | Surfynol 465 | 0.1 |
| | Exp. Purple | 24.0 |
| | Exp. Blue 8628 | 12.0 |
| | Exp. Yellow 8625 | 16.8 |
| | Exp. Orange 8626 | 9.6 |
| | Exp. Red 8627 | 7.2 |
| | Zirconium lactate | 0.5 |

Each ink formulation was prepared by mixing the first four components and heating the resulting mixture at 35–40° C. The next two components were added to the heated mixture, followed by the addition of the remaining components. The resulting formulation was mixed thoroughly and allowed to cool to ambient temperature (about 20–25° C.). The ink formulations then were passed through a 0.45 micrometer filter.

The ink set was applied to two different fabrics (silk and 100 percent cotton) by means of an ink jet printer and treated with heat for varying times and at different temperatures. Control fabrics did not receive a heat treatment. Each fabric was washed three times using a normal wash cycle, in warm water (i.e., 35° C. or 95° F.) with the recommended amount of Tide® detergent (according to manufacturer's directions). The fabrics were measured before and after washing with a Hunter Colorimeter to determine color loss as a result of washing. The amount or degree of color loss was inversely related to the ability of the ink to adhere to the fabric, i.e., ink durability, over repeated wash cycles.

The results are summarized in Tables 1 and 2. In the tables, direct heat refers to a standard heat press having platens heated to the indicated temperature. All times are in minutes and all temperatures are in degrees Celsius; "Mag." represents magenta.

TABLE 1

Summary of Results with Silk Fabric

| Heat Treatment | | | % Color Loss | | |
|---|---|---|---|---|---|
| Type | Time | Temp. | Mag. | Cyan | Comments |
| None | — | — | 25 | 25 | Control fabric |
| Direct | 15 | 138 | 0 | 0 | Some heat discoloration |
| Direct | 5 | 177 | 50 | 50 | |
| Oven | 90 | 138 | 0 | 0 | Some heat discoloration |
| Oven | 30 | 177 | 0 | 0 | Some heat discoloration |
| Oven | 15 | 191 | 0 | 0 | Some heat discoloration |

TABLE 2

Summary of Results with 100% Cotton Fabric

| Heat Treatment | | | % Color Loss | | |
|---|---|---|---|---|---|
| Type | Time | Temp. | Mag. | Cyan | Comments |
| None | — | — | 40 | 26 | Control fabric |
| Direct | 5 | 177 | 0 | 0 | Yellowing of fabric |
| Direct | 3 | 191 | 4 | 2 | |

EXAMPLE 2

The procedure of Example 1 was repeated, except that the polymeric ink set was replaced with a direct/reactive ink set and the mixing temperature was 40° C. The ink jet ink formulations making up the direct/reactive ink set are summarized below.

| Formula | Components | Weight Percent |
|---|---|---|
| 5 | Distilled water | 81.7 |
| | 2-Pyrrolidone | 7.0 |
| | Giv-Gard DXN | 0.4 |
| | Cobratec 99 | 0.1 |
| | Direct Yellow 132 | 9.1 |
| | Direct Yellow 5 crude 8678 | 1.5 |
| | Zirconium lactate | 0.2 |
| | TRIS | 0.15 |
| 6 | Distilled water | 85.1 |
| | 2-Pyrrolidone | 7.0 |
| | Giv-Gard DXN | 0.4 |
| | Triethanolamine | 0.2 |
| | Cobratec 99 | 0.1 |
| | Direct Blue 199 solution | 6.0 |
| | Dyestar, Levafix Blue E-FR | 1.0 |
| | Zirconium lactate | 0.2 |
| 7 | Distilled water | 80.0 |
| | 2-Pyrrolidone | 7.0 |
| | Glycerin | 6.0 |
| | Giv-Gard DXN | 0.2 |
| | Triethanolamine | 0.5 |
| | Cobratec 99 | 0.1 |
| | Spectra Fix Black VS B crude | 6.0 |
| | Zirconium lactate | 0.2 |
| 8 | Distilled water | 81.9 |
| | 2-Pyrrolidone | 7.0 |
| | Glycerin | 6.0 |
| | Giv-Gard DXN | 0.2 |
| | Triethanolamine | 0.5 |
| | Cobratec 99 | 0.1 |
| | Spectra Fix Red 195 crude | 4.1 |
| | Zirconium lactate | 0.2 |

The results are summarized in Table 3 and 4.

TABLE 3

Summary of Results with Silk Fabric

| Heat Treatment | | | % Color Loss | | |
|---|---|---|---|---|---|
| Type | Time | Temp. | Mag. | Cyan | Comments |
| None | — | — | 0 | 0 | Control fabric |
| Direct | 15 | 138 | 0 | 0 | |
| Direct | 5 | 177 | 0 | 50 | |
| Oven | 90 | 138 | 0 | 0 | |
| Oven | 30 | 177 | 0 | 90 | |
| Oven | 15 | 191 | 0 | 90 | |

TABLE 4

Summary of Results with 100% Cotton Fabric

| Heat Treatment | | | % Color Loss | | |
|---|---|---|---|---|---|
| Type | Time | Temp. | Mag. | Cyan | Comments |
| None | — | — | 45 | 25 | Control fabric |
| Direct | 5 | 177 | 35 | 15 | |
| Direct | 3 | 191 | 25 | 12 | |

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of improving the adhesion of an ink jet ink formulation to a substrate, the method comprising:

adding to the ink jet ink formulation an amount of a chelate of a transition metal or a chelate of a mixture of transition metals effective to improve the adhesion of the ink jet ink formulation to the substrate;

printing the substrate with the chelate-containing ink jet ink formulation; and treating the printed substrate with heat for a time and at a temperature to further improve the adhesion of the ink jet ink formulation to the substrate.

2. The method of claim 1, in which the ink jet ink formulation comprises a diluent system and colorant.

3. The method of claim 2, in which the diluent system is an aqueous diluent system or a non-aqueous diluent system.

4. The method of claim 3, in which the aqueous diluent system is selected from the group consisting of:

water containing in the range of about 0.5 up to about 3.0 percent by weight of a mixture of isopropyl alcohol and at least one alcohol having a boiling point of less than 130° C.;

water containing in the range of about 2.5 up to about 25 percent by weight of pyrrolidone or a derivative thereof;

water containing in the range of about 2 up to about 20 percent by weight of 1,3-propanediol or a derivative thereof;

water containing in the range of about 1 up to about 50 percent by weight of a glycol ether; and water containing in the range of about 5 up to about 25 percent by weight isopropyl alcohol, about 30 up to about 80 percent by weight of N-methyl pyrrolidone, and 0 up to about 60 percent by weight of ethylene glycol monoethyl ether.

5. The method of claim 4, in which the aqueous diluent system is selected from the group consisting of:

a composition comprising 87.1 percent by weight distilled water and 5 percent by weight 2-pyrrolidone;

a composition comprising 89 percent by weight distilled water and 4 percent by eight 2-pyrrolidone;

a composition comprising 74.1 percent by weight distilled water, 5 percent by eight glycerin, 5 percent by weight thiodiglycol, and 2 percent by weight diethylene glycol;

a composition comprising 90.6 percent by weight distilled water and 4.1 percent by weight 2-pyrrolidone;

a composition comprising 86.8 percent by weight distilled water and 4 percent by weight polyethylene glycol 400; and a composition comprising 15.4 percent by weight distilled water, 7.6 percent by weight isopropyl alcohol, 61.0 percent by weight N-methyl pyrrolidone, and 13.7 percent by weight ethylene glycol monoethyl ether.

6. The method of claim 3, in which the non-aqueous diluent system comprises methyl lactate; ethyl lactate; butyl lactate; isopropyl lactate; diacetone alcohol; ethylene glycol; diethylene glycol; triethylene glycol; 1,3-butylene glycol; 1,5-pentanediol; isophorone; xylene; mineral spirits; an aromatic distillation fraction; glycerol; ethylene glycol monomethyl ether; propylene glycol monomethyl ether; diethylene glycol mono-n-hexyl ether; or a mixture of any two or more thereof.

7. The method of claim 1, in which the substrate is paper, fabric, a polymeric film, a cellulosic film, glass, metal, wood, vellum, or carbon.

8. The method of claim 7, in which the fabric contains free hydroxyl and/or free carboxyl groups.

9. The method of claim 7, in which the fabric is 100 percent cotton, a cotton/polyester blend, silk, rayon, wool, nylon, latex, butyl rubber, vinyl, or a polyamide fiber.

10. The method of claim 7, in which the paper is ragbond paper, coated paper, or emulsion coated paper.

11. The method of claim 1, in which the chelate is a derivative of caprylic acid, capric acid, citric acid, lactic acid, lauric acid, myristic acid, palmitic acid, stearic acid, tartaric acid, cyclohexanecarboxylic acid, boric acid, or an ammonium complex.

12. The method of claim 1, in which the transition metal or mixture of transition metals is selected from the group consisting of Ti, V, Cr, Mn, Fe, Co, Ni, Cu, Zr, Nb, Mo, Ru, Rh, Pd, W, Ti-Ni, Ni-Cr, Fe-Co, Ti-W, Fe-Ti, Fe-Ni, Fe-Cr, Fe-Ni-Cr, Mo-Si and W-Si.

13. The method of claim 1, in which the chelate is present in a range of about 0.001 up to about 20 percent by weight, based on the total weight of the chelate-containing ink jet ink formulation.

14. The method of claim 1, in which the chelate is zirconium lactate.

15. The method of claim 1, in which the chelate-containing ink jet ink formulation is selected from the group consisting of:

a composition comprising 87.1 percent by weight distilled water, 5 percent by weight 2-pyrrolidone, 0.1 percent by weight biocide, 0.1 percent by weight anticorrosive, 1 percent by weight buffer, 6.5 percent by weight polymeric colorant, and 0.2 percent by weight zirconium lactate;

a composition comprising 89 percent by weight distilled water, 4 percent by weight 2-pyrrolidone, 0.1 percent by weight biocide, 0.1 percent by weight anticorrosive, 0.3 percent by weight buffer, 0.3 percent by weight surfactant, 6 percent by weight reactive black dye, and 0.2 percent by weight zirconium lactate;

a composition comprising 74.1 percent by weight distilled water, 5 percent by weight glycerin, 5 percent by weight thiodiglycol, 2 percent by weight diethylene glycol, 0.1 percent by weight biocide, 1 percent by weight surfactant, 0.1 percent by weight anticorrosive, 0.5 percent buffer, 11.9 percent by weight acid yellow dye, 0.1 percent acid red dye, and 0.2 percent by weight zirconium lactate. a composition comprising 90.6 percent by weight distilled water, 4.1 percent by weight 2-pyrrolidone, 0.2 percent by weight biocide, 0.2 percent by weight anticorrosive, 0.3 percent buffer, 0.3 percent by weight surfactant, 4.1 percent reactive red dye, and 0.2 percent by weight zirconium lactate;

a composition comprising 86.8 percent by weight distilled water, 4 percent by weight polyethylene glycol 400, 0.1 percent by weight biocide, 0.1 percent by weight anticorrosive, 12 percent buffer, 7.8 polymeric colorant, and 0.2 percent by weight zirconium lactate; and a composition comprising 15.4 percent by weight distilled water, 7.6 percent by weight isopropyl alcohol, 61.0 percent by weight N-methyl pyrrolidone, 13.7 percent by weight ethylene glycol monoethyl ether, 0.1 percent by weight biocide, 0.7 percent by weight surfactant, 1.5 percent by weight G.I. blue dye, and 0.2 percent by weight zirconium lactate.

16. The method of claim 2, in which the colorant is a dispersion of a pigment, a dye, or a polymeric colorant.

17. The method of claim 16, in which the dispersion of a pigment is a dispersion of phthalocyanine blue, carbon black, mars black, quinacridone magenta, ivory black, prussian blue, cobalt blue, ultramarine blue, manganese blue, cerulean blue, indathrone blue, chromium oxide, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophytal yellow 8GN, toluidine red, quinacridone red, permanent crimson, rose madder, alizarin crimson, vermillion, cadmium red, permanent red FRG, brominated anthranthrone, naphthol carbamide, perylene red, quinacridone red, chromophthal red BRN, chromophthal scarlet R, aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorus oxide, potassium oxide, rutile, silicon oxide, silver oxide, sodium oxide, strontium oxide, tin oxide, titanium oxide, vanadium oxide, zinc oxide, zirconium oxide, or a mixture of any two or more thereof.

18. The method of claim 17, in which the ink jet ink formulation contains the dispersion of a pigment in a range of about 6 up to about 20 percent by weight.

19. The method of claim 16, in which the dye is C.I. Food Black, C.I. Acid Black, C.I. Direct Black, C.I. Reactive Black, C.I. Acid Red, C.I. Direct Red, C.I. Acid Violet, C.I. Direct Violet, C.I. Reactive Red, C.I. Acid Blue, C.I. Direct Blue, C.I. Reactive Blue, C.I. Acid Yellow, C.I. Direct Yellow, C.I. Reactive Yellow, or a mixture of any two or more thereof.

20. The method of claim 19, in which the ink jet ink formulation contains the dye in a range of about 4 up to about 20 percent by weight.

21. The method of claim 16, in which the polymeric colorant is selected from:

(a) materials having the general formula:

$$R\text{-(polymeric backbone-X)}_n$$

wherein:

R is an organic dyestuff radical, the polymeric backbone is a thermoplastic linear polyester, X is a reactive moiety, and n is an integer falling in the range of 1 up to about 6; or (b) an intimate mixture of:

a water-insoluble polymeric colorant comprising a linear, thermoplastic polyester having copolymerized therein at least 5 percent by weight, based on the weight of the colorant, of residues of one or more monomeric, organic colorant compounds, and an ionic or amphoteric surfactant, optionally containing a non-ionic poly(oxyalkylene) surfactant.

22. The method of claim 21, in which the ink jet ink formulation contains the polymeric colorant in a range of about 1 up to about 12 percent by weight.

23. The method of claim 2, in which the ink jet ink formulation further comprises one or more of a biocide, a surface active agent, a corrosion inhibitor, a pH adjusting agent, an aqueous diluent, a non-aqueous diluent, an ultraviolet absorber, and an infrared absorber.

24. The method of claim 1, in which the treatment time is in a range of from about 1 minute to about 90 minutes.

25. The method of claim 1, in which the treatment temperature is in a range of from about 90° C. to about 205° C.

26. The method of claim 1, in which the treatment time and temperature are about three minutes and about 190° C., respectively.

27. In a method of improving the adhesion of an ink jet ink formulation to a substrate, wherein the method comprises adding to the ink jet ink formulation an amount of a chelate of a transition metal or a chelate of a mixture of transition metals effective to improve the adhesion of the ink jet ink formulation to the substrate; the improvement which comprises:

printing the substrate with the chelate-containing ink jet ink formulation; and treating the printed substrate with heat for a time and at a temperature to further improve the adhesion of the ink jet ink formulation to the substrate.

* * * * *